United States Patent
Wuske et al.

(10) Patent No.: US 10,330,926 B2
(45) Date of Patent: Jun. 25, 2019

(54) COMPONENT AND OPTICAL ELEMENT WITH ANTIFOGGING PROPERTIES

(71) Applicant: Dräger Safety AG & Co. KGaA, Lübeck (DE)

(72) Inventors: Thomas Wuske, Malente (DE); Jürgen Unger, Ahrensfelde (DE); Catharina Wenzek, Gelsenkirchen (DE); Tobias Seidl, VV Amsterdam (NL)

(73) Assignee: DRÄGER SAFETY AG & CO. KGAA, LÜBECK (DE)

( * ) Notice: Subject to any disclaimer, the term of this patent is extended or adjusted under 35 U.S.C. 154(b) by 276 days.

(21) Appl. No.: 15/296,372

(22) Filed: Oct. 18, 2016

(65) Prior Publication Data
US 2017/0108694 A1 Apr. 20, 2017

(30) Foreign Application Priority Data
Oct. 19, 2015 (DE) .......................... 10 2015 013 398

(51) Int. Cl.
*B32B 3/12* (2006.01)
*G02B 27/00* (2006.01)
(52) U.S. Cl.
CPC ............ *G02B 27/0006* (2013.01); *B32B 3/12* (2013.01); *B32B 2551/00* (2013.01)
(58) Field of Classification Search
None
See application file for complete search history.

(56) References Cited

U.S. PATENT DOCUMENTS

| | | |
|---|---|---|
| 2007/0166513 A1 | 7/2007 | Sheng et al. |
| 2009/0317590 A1 | 12/2009 | Hwang et al. |
| 2015/0196940 A1 | 7/2015 | Aizenberg et al. |
| 2015/0374550 A1* | 12/2015 | Saylor .................... A61F 9/028 2/436 |

FOREIGN PATENT DOCUMENTS

| | | |
|---|---|---|
| DE | 696 26 266 T2 | 10/2003 |
| DE | 10 2006 008 784 A1 | 9/2007 |
| EP | 0 871 046 A1 | 10/1998 |
| EP | 1 324 078 A2 | 7/2003 |

OTHER PUBLICATIONS

W. J. Hamilton et al., Fog basking by the Namib Desert beetle, Onymacris unguicularis, Nature, vol. 262, 1976, pp. 284-285.
Lianbin Zhang et al., Inkjet printing for direct micropatterning of a superhydrophobic surface: toward biomimetic fog harvesting surfaces; J. Mater. Chem. A, 2015, 3 , pp. 2844-2852.
Pao-Hsiang Tung et al. "Formation of Honeycomb structures and Superhydrophobic Surfaces by Casting a Block Copolymer from Selective Solvent Mixtures", Macromol. Rapid Commun. 2007, 28, 271-275.
Jiaming Ye et al: Superhydrophilicity of anodic aluminum oxide films: From "honeycomb" to "bird's nest". Thin Solid Films 517 (2009) 6012-6015. Journal homepage: www.elsevier.com/locate/tsf.
J. Drelilch et al. "Hydrophilic and superhydrophilic surfaces and materials". Soft Matter, 2011, 7, 9804-9828.

* cited by examiner

*Primary Examiner* — David Sample
*Assistant Examiner* — Mary I Omori
(74) *Attorney, Agent, or Firm* — McGlew and Tuttle, P.C.

(57) ABSTRACT

A component, especially an optical element, has a non-fogging surface. The surface has a honeycomb structure (1) with a plurality of honeycombs (2).

9 Claims, 2 Drawing Sheets

COMPONENT AND OPTICAL ELEMENT WITH ANTIFOGGING PROPERTIES

CROSS REFERENCE TO RELATED APPLICATIONS

This application claims the benefit of priority under 35 U.S.C. § 119 of German Application 10 2015 013 398.5 filed Oct. 19, 2015, the entire contents of which are incorporated herein by reference.

FIELD OF THE INVENTION

The present invention pertains to a component, and especially an optical element, with non-fogging surface.

BACKGROUND OF THE INVENTION

The fogging of surfaces, especially of optical elements, which is caused by condensation effects and precipitating moisture, is problematic in many respects. It is important not only in leisure areas, for example, in sports or in traffic, but also especially in safety engineering products that the operability of the components always be guaranteed. In objects of personal safety gear, for example, the visual capacity may be highly limited due to fogged mask disks, glasses and disks of protective suits due to condensation. As a result of a limited visibility, it could be that rescue operations would have to be interrupted or a fast escape from a life-threatening environment becomes hindered.

Various approaches have already been followed to reduce fogging of a surface. In this connection, mechanical methods, such as heating the disks or installing a wiper in the inner area of disks, are not only technically complicated to manufacture, but also prone to malfunction. In addition, a constant supply of current must be guaranteed so that the effect is maintained.

Furthermore, methods have been described, in which hydrophilic or hydrophobic surface properties are utilized. In multilayer systems as shown in DE 10 2006 008 784 A1 and in EP 0 871 046 A1, a lower hydrophilic, water-storing layer is covered with another mostly hydrophobic layer, which has holes or a porous structure. Moisture reaches the water-storing layer through the cavities and an antifogging effect is achieved.

However, a plurality of layers must be manufactured in a complicated process for this, and the pores or holes are inserted into the surface coating in a specific manner. If the maximum capacity of the water-storing layer is reached, a fogging of the surface occurs nevertheless; thus, the function of the components is only guaranteed in limited areas of application.

Another method for reducing fogging is the coating or the specific preparation of a surface having a hydrophilic character, based on the chemical properties of defined substances. DE 696 26 266 T2 describes the polycondensation of polyacrylic acid compounds with inorganic alkoxides as non-fogging antireflection film. Another example of a hydrophilic coating is disclosed in EP 1 324 078 A2. In this connection, a hydrophilic surface is produced by means of vapor deposition of organic substances with hydrophilic groups together with inorganic oxides.

The drawback of using a hydrophilic surface as an antifogging agent is that the capacity of the water-storing layer, which shall form a thin transparent fluid film, is limited in this case as well. It is also important that the surface coating be uniform and be configured as contiguous. This requires a very precise manufacturing method. In addition, these usually very thin layers do not have a stable enough configuration, so that these layers are worn out and lose their effect in case of mechanical stress, for example, during a cleaning of the components.

SUMMARY OF THE INVENTION

An object of the present invention is to overcome the mentioned drawbacks and other drawbacks of the state of the art and to provide a component, especially an optical element, which prevents fogging and thus impairment of visibility. This effect shall be guaranteed over the long term and even under harsh conditions, such as multiple cleaning and disinfection cycles. Furthermore, this component is able to be manufactured in a cost-effective and simple manner.

In case of a component, which is especially configured as an optical element, having a non-fogging surface, the present invention provides that the surface has a honeycomb structure with a plurality of honeycombs. This may be in particular webs providing a honeycomb form. The component may be a personal safety gear mask disk or mask optical element. At least one capillary tube may be formed in the honeycomb structure. This at least one capillary tube ends in a water absorbing area.

An excellent hydrophilic surface property is achieved by means of the structuring of the surface. If moisture condenses on this structure, drops precipitate in the honeycombs. The honeycombs are configured according to the invention such that adhesive forces between the honeycomb walls (webs) and the drops are greater than cohesive forces within the drops. As a result, a uniform, thin fluid film is formed on the surface. In this connection, a contact angle of the drops on the surface structured according to the present invention is smaller than one on an unstructured surface. The contiguous, thin water film is not split further into individual drops, which would have a negative effect on the transparency of the surface of the component.

The honeycombs have a polygonal, especially rectangular, hexagonal, or octagonal configuration in a preferred embodiment. However, other geometric shapes such as triangular, pentagonal, heptagonal up to round are also possible. In this connection, shapes with a constant lateral side length, which lead to symmetrical honeycombs, are preferred.

The geometric shape has an effect on the adhesive forces between the drops and the honeycomb walls. Depending on the needed film properties, one or more suitable shapes and size are selected for the structuring.

Provisions are preferably made for the honeycombs to be arranged uniformly over the entire surface of the component, which can be used as an optical element, so that the fluid film extends uniformly over the entire surface of the component.

In a simple embodiment, the non-fogging surface has a plastic, into which the honeycomb structure is integrated.

In an alternative embodiment, the surface of the component is configured as a multilayer composite system, the topmost layer being applied as a honeycomb structure or the honeycomb structure being inserted into the topmost layer.

In addition, the surface may also consist of other materials, for example, glass.

In a preferred variant, the excellent hydrophilic property of the honeycomb structuring is increased by the use of hydrophilic materials as the surface. A reinforced hydrophilic property of the surface can support the formation and maintenance of a uniform fluid film under extreme conditions, such as high temperatures.

A honeycomb (honeycomb form) has an inner width of 5 µm to 20 µm in a preferred embodiment. Furthermore, the honeycomb has especially a depth of 1 µm to 10 µm. If the honeycombs selected are too wide, individual drops of fluid precipitate within the honeycombs, as a result of which the antifogging effect is adversely affected. The same applies to honeycombs with a configuration that is too flat. In honeycombs that are too small and too deep, too much water is absorbed by the honeycombs, similar to a capillary tube effect, as a result of which the visibility is likewise adversely affected.

According to a preferred embodiment of the honeycomb structure, the honeycombs interior spaces are separated from one another by webs. These webs have a preferred width of 0.5 µm to 5 µm, especially a width of 1 µm to 3 µm. This shape guarantees an as uniform as possible fluid film on the surface of the component and an optical visibility through the optical element. In this embodiment, no additional fluid may condense out on the webs either, which would in turn lead to fogging.

Another embodiment of the present invention provides that at least one capillary tube is formed in the honeycomb structure. The at least one capillary tube connects adjacent honeycombs (connects the interiors of adjacent honeycomb forms) to one another. The capillary tube makes possible a best possible antifogging effect even in case of a horizontal position of use of the component. In case of a vertical position of use, additionally condensing fluid, which condenses after a uniform thin film was formed because of the effect of gravity, simply flows off from the surface. In the case of a horizontal position of use, the capillary tube is used for the removal of excess fluid. The at least one capillary tube is formed for this in the webs of the honeycombs. It is preferred to form the capillary tube by recessed webs (webs that have a shorter height relative to the honeycomb interior surface region or are recessed relative to the honeycomb interior surface region).

In an important variant, the capillary tube is arranged between the honeycombs in the form of a closed channel.

The at least one capillary tube preferably ends in a water absorbing area. This prevents fluid from dripping down on the edges in an uncontrolled manner. An uncontrolled precipitation of fluid in safety engineering products would lead to moist sites, which not only has a negative effect on the well-being of the user, but also leads to friction-related pressure sores and abrasions.

The dimensions of the water-carrying capillary tube are dependent on the quantity of water to be removed and on the conveying speed (flow rate), with which the water shall be removed. Overall, the dimensions of surface structures in case of optical components are preset by the limits of the visual perception of the human eye.

A variant of a component, especially of an optical element, may be a mask disk of a personal safety gear. In this case, provisions may be made for only the inner side or only the outer side or both sides of the optical element having the non-fogging surface according to the present invention.

Further features, details and advantages of the present invention appear from the text of the claims as well as from the following descriptions of exemplary embodiments based on the drawings. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
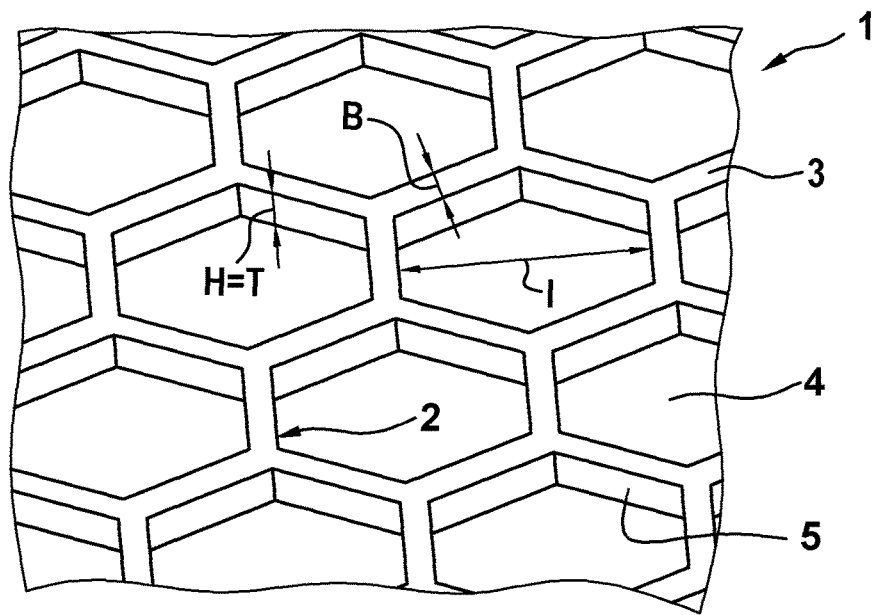
FIG. 1 is a detailed perspective view of a honeycomb structure according to the present invention.

Referring to the drawings, FIG. 1 shows a detailed view of the honeycomb structure according to the present invention, which is generally designated by 1.

The honeycomb structure generally designated 1 has a plurality of honeycombs (honeycomb forms) generally designated 2 that are comprised of webs 3 that separate an interior space/interior area 4 of a honeycomb 2 from an interior space/interior area 4 of another honeycomb 2. FIG. 1 shows hexagonal recesses (interior space/interior area) 4 enclosed by webs 3 that are configured as honeycombs 2. The possible embodiments of the honeycombs are, however, not limited thereto. Rather, the honeycombs 2 may be polygonal, especially rectangular, hexagonal or octagonal. A round shape of the honeycombs as an embodiment variant is also possible. The structure 1 with honeycomb forms 2 can be produced via various manufacturing methods. Processes, which operate mechanically, chemically, by heat or concentrated light action as well as with generative methods, are possible.

The honeycombs 2 have an inner width I of 5 µm to 20 µm. The depth T of the honeycombs 2 is determined by the height H of the webs 3. Dimensions of 1 µm to 10 µm are preferred for the depth T or the height H. Another property-determining parameter is the width B of the webs 3, which is in the range of 0.5 µm to 5 µm, especially of 1 µm to 3 µm.

If moisture condenses out on the surface of this structure 1, fluid drops precipitate into the honeycombs 2. In this case, the adhesive forces between the honeycomb walls 5, which are formed by the webs 3—the interior sidewalls of the webs 3, and the drops are stronger than the cohesive forces within the drops. The contact angle of water on a surface 1 structured in the shape according to the present invention is smaller than on an unstructured surface. In this way, a contiguous, thin water film, which is not split again into individual drops, which would have a negative effect on the transparency, is formed on the structure 1.

If the structured surface 1 is used in a vertical position of use, fluid condensing out flows off from the surface because of the effect of gravity.

Figure 2:
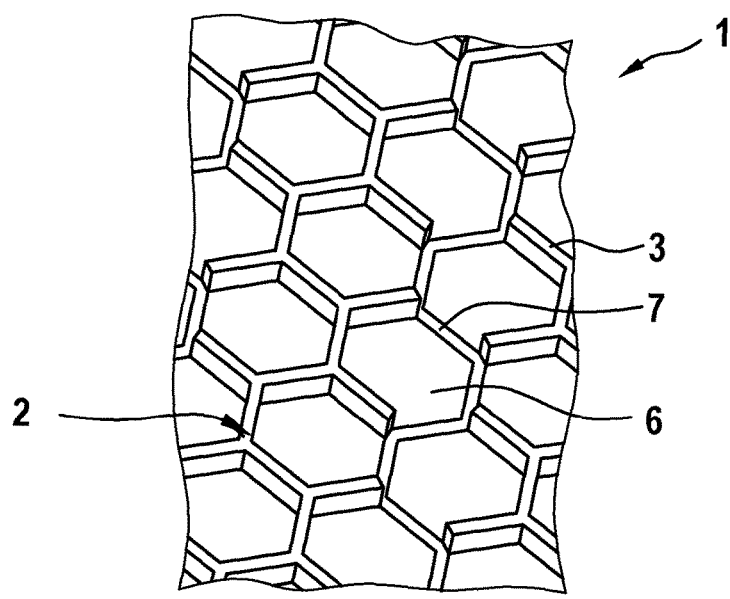
FIG. 2 is a perspective view of an embodiment of a honeycomb structure with capillary tube.

An embodiment with at least one capillary tube 6 is advantageous for a mainly horizontal position of use. FIG. 2 shows an embodiment with a capillary tube 6, which is formed by recessed inserted webs 7. The recessed webs 7 are lower in height H as compared to the height H of the other webs 3 of the same honeycomb 2 and of other honeycombs 2. The honeycombs 2, in particular the interior space/interior area 4 of the honeycombs, are connected to one another via the capillary tube 6 formed by recessed webs 7 in the embodiment of FIG. 2.

Figure 3:
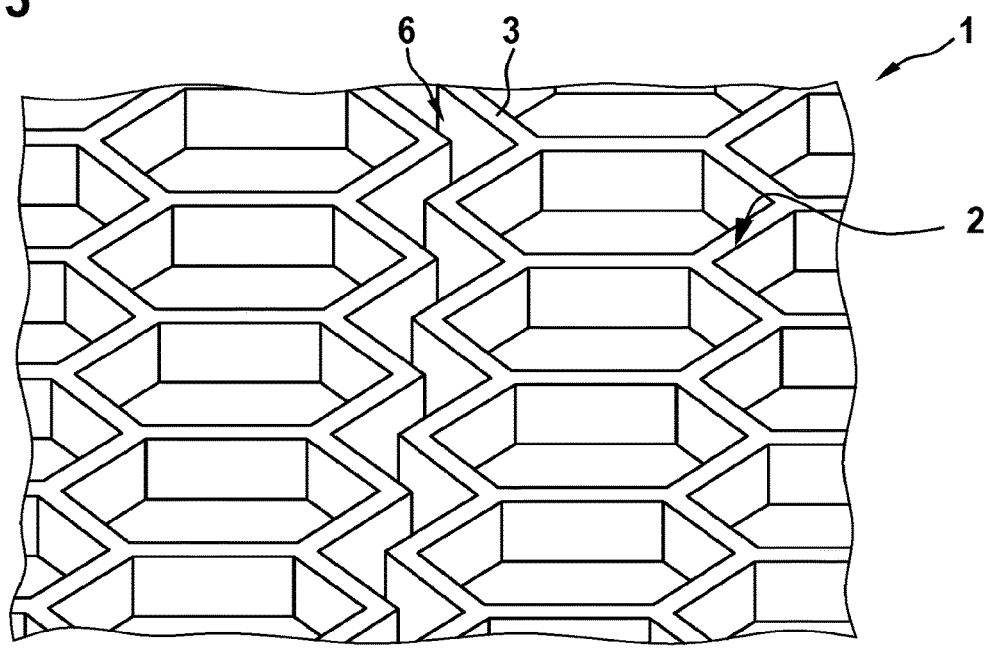
FIG. 3 is a perspective view of another embodiment of a honeycomb structure with capillary tube.

It is also possible that the capillary tube 6 are formed by the webs 3 of the honeycombs 2, without these being lowered. This is shown in FIG. 3. The capillary tube 6 lies between two areas with honeycombs 2 and is limited by the outer webs 3 in this embodiment.

Figure 4:
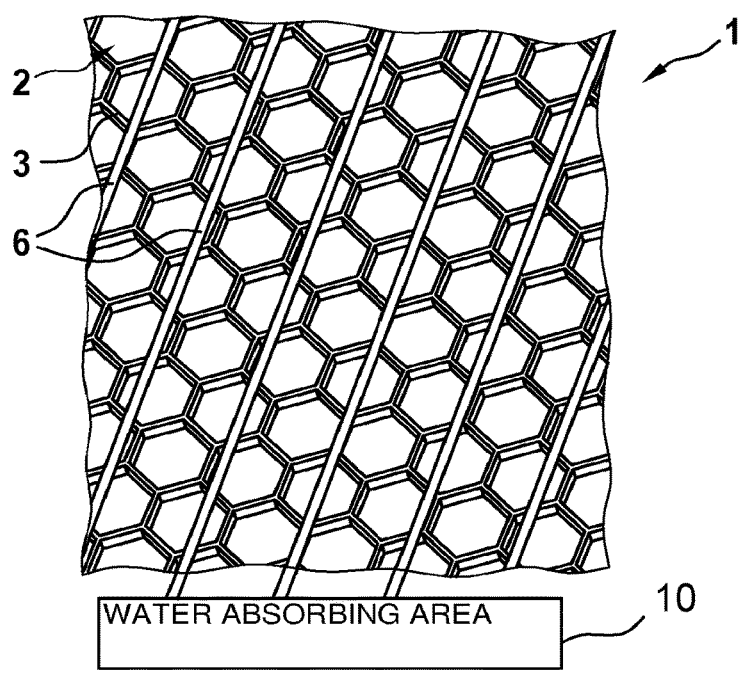
FIG. 4 is a perspective view of another embodiment of a honeycomb structure with capillary tube.

Another honeycomb structure 1 with capillary tubes 6 is shown in FIG. 4. The capillary tubes 6 run straight through the honeycombs 2 and the webs 3. This embodiment is made possible by recesses or depressions in the webs 3.

The capillary tube 6 end in a water absorbing area 10. This water absorbing area 10 collects excess fluid, without an uncontrolled dripping or wetting of adjacent components occurring. This area of water absorption 10 is shown schematically fluidically connected to some of the capillary tubes 6 in FIG. 4.

While specific embodiments of the invention have been shown and described in detail to illustrate the application of the principles of the invention, it will be understood that the invention may be embodied otherwise without departing from such principles.

APPENDIX

List of Reference Numbers

1 Honeycomb structure
2 Honeycombs
3 Webs
4 Recesses
5 Honeycomb walls
6 Capillary tube
I Inner width of the honeycombs 2
T Depth of the honeycombs 2
H Height of the webs 3

What is claimed is:

1. A personal safety gear mask optical element comprising a non-fogging surface, the surface comprising:
    a honeycomb structure comprising a plurality of honeycomb cells, each of the honeycomb cells has a honeycomb depth, the honeycomb depth being 1 μm to 10 μm, and each of the honeycomb cells has an inner width of 5 μm to 20 μm;
    at least one capillary tube formed in the honeycomb structure; and
    a water absorbing area, the at least one capillary tube ending in the water absorbing area, wherein the at least one capillary tube connects an interior space of one of the honeycomb cells of the plurality of honeycomb cells to an interior space of an adjacent honeycomb cell of the plurality of honeycomb cells.

2. The personal safety gear mask optical element in accordance with claim 1, wherein each of honeycomb cells of the plurality of honeycomb cells has a polygonal configuration.

3. The personal safety gear mask optical element in accordance with claim 2, wherein each of honeycomb cells of the plurality of honeycomb cells has a rectangular or hexagonal or octagonal configuration.

4. The personal safety gear mask optical element in accordance with claim 1, wherein each of honeycomb cells of the plurality of honeycomb cells has a round configuration.

5. The personal safety gear mask optical element in accordance with claim 1, wherein each of the honeycomb cells of the plurality of honeycomb cells comprises webs separating the interior space of one of the honeycomb cells of the plurality of honeycomb cells from the interior space of the adjacent honeycomb cell of the plurality of honeycomb cells and the webs have a web width of 0.5 μm to 5 μm.

6. The personal safety gear mask optical element in accordance with claim 1, wherein each of the honeycomb cells of the plurality of honeycomb cells comprises webs separating the interior space of one of the honeycomb cells of the plurality of honeycomb cells from the interior spaces of the adjacent honeycomb cell of the plurality of honeycomb cells and the webs have a web width of 1 μm to 3 μm.

7. The personal safety gear mask optical element in accordance with claim 1, wherein:
    each of the honeycomb cells of the plurality of honeycomb cells comprises webs separating the interior space of one of the honeycomb cells of the plurality of honeycomb cells from the interior space of the adjacent honeycomb cell of the plurality of honeycomb cells; and
    the at least one capillary tube is formed in the webs of the honeycomb cells.

8. A personal safety gear mask optical element comprising a non-fogging surface, the surface comprising:
    a honeycomb structure comprising a plurality of honeycomb cells;
    at least one capillary tube in the honeycomb structure; and
    a water absorbing area, the at least one capillary tube ending in the water absorbing area, and the at least one capillary tube connecting an interior spaces of one of the honeycomb cells of the plurality of honeycomb cells to an interior space of an adjacent honeycomb cell of the plurality of honeycomb cells.

9. A personal safety gear mask optical element comprising a non-fogging surface, the surface comprising:
    a honeycomb structure comprising a plurality of honeycomb cells;
    at least one capillary tube in the honeycomb structure; and
    a water absorbing area, the at least one capillary tube ending in the water absorbing area each of the honeycomb cells of the plurality of honeycomb cells comprises webs separating an interior space of one of the honeycomb cells of the plurality of honeycomb cells from an interior space of an adjacent honeycomb cell of the plurality of honeycomb cells, the at least one capillary tube is formed in the webs of the honeycomb cells.

* * * * *